(12) United States Patent
Bharadwaj et al.

(10) Patent No.: US 11,372,732 B2
(45) Date of Patent: Jun. 28, 2022

(54) SYSTEMS AND METHODS FOR AGENTLESS AND ACCELERATED BACKUP OF A DATABASE

(71) Applicant: Veritas Technologies LLC, Santa Clara, CA (US)

(72) Inventors: Vaijayanti Bharadwaj, Pune (IN); Chirag Dalal, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 147 days.

(21) Appl. No.: 16/800,322

(22) Filed: Feb. 25, 2020

(65) Prior Publication Data

US 2021/0263810 A1 Aug. 26, 2021

(51) Int. Cl.
*G06F 11/00* (2006.01)
*G06F 11/14* (2006.01)
*G06F 16/182* (2019.01)

(52) U.S. Cl.
CPC ...... *G06F 11/1469* (2013.01); *G06F 11/1453* (2013.01); *G06F 11/1464* (2013.01); *G06F 11/1471* (2013.01); *G06F 11/1474* (2013.01); *G06F 16/183* (2019.01); *G06F 2201/80* (2013.01)

(58) Field of Classification Search
CPC ............. G06F 11/1469; G06F 11/1453; G06F 11/1464; G06F 11/1471; G06F 11/1474; G06F 11/1446; G06F 16/183; G06F 2201/80
See application file for complete search history.

(56) References Cited

U.S. PATENT DOCUMENTS

| | | |
|---|---|---|
| 10,210,052 B1 | 2/2019 | Kumar et al. |
| 2006/0064444 A1 | 3/2006 | van Ingen et al. |
| 2007/0233756 A1* | 10/2007 | D'Souza ............. G06F 11/2041 |
| 2012/0078855 A1* | 3/2012 | Beatty ................. G06F 11/1469 |
| | | 707/676 |
| 2016/0314046 A1 | 10/2016 | Kumarasamy |
| 2017/0300386 A1* | 10/2017 | Shulga .................... G06F 11/14 |
| 2020/0250046 A1* | 8/2020 | Wong ...................... G06F 9/461 |

OTHER PUBLICATIONS

International Search Report and Written Opinion received for PCT Application Serial No. PCT/US2021/019346 dated Jun. 11, 2021, 16 pages.

* cited by examiner

*Primary Examiner* — Joseph D Manoskey
(74) *Attorney, Agent, or Firm* — FisherBroyles, LLP (57) ABSTRACT

The disclosed computer-implemented method for agentless and accelerated backup of a database may include, receiving, by a data backup device from a data server, blocks of data that provide a full backup of data of the data server. The method additionally includes receiving, by the data backup device from the data server, one or more native logs indicating one or more transactions performed by the data server. The method also includes determining, by the data backup device and based on the native logs, one or more changed blocks of the blocks of data. The method further includes providing, by the data backup device, a point in time restore of the data server by creating a synthetic full backup that overlays one or more of the blocks of data with the one or more changed blocks, and that shares remaining blocks of the blocks of data with the full backup.

20 Claims, 9 Drawing Sheets

SYSTEMS AND METHODS FOR AGENTLESS AND ACCELERATED BACKUP OF A DATABASE

BACKGROUND

Most database backups today are implemented as log backups. A full backup of the database files is taken in a stable state and then logs are copied so that point in time restore is possible. The logs record each transaction that occurs in the database, such as data being deleted, making it possible to go back transaction by transaction or select a point in time by providing a transaction identifier. With log backups, the backups are consistent because incremental updates are transaction log updates and a database knows how to implement these updates consistently. Enterprise databases also support log backups natively.

The log backup methodology yields a few problems, however. For example, an agent is required to run on the production host that runs the database (i.e., data server). Additionally, restoring the database requires application specific logic. Also, periodic full backups are necessary because database restoration from log backups requires replaying the logs at the production host, which leads to increased recovery time objective (RTO). The requirement to replay the logs at the production host also means that instant access cannot be provided, and it is not possible to use an acceleration feature, which can provide a full backup for the cost of an incremental backup.

SUMMARY

As will be described in greater detail below, the present disclosure describes various systems and methods for agentless and accelerated backup of a database by creating, by determining changed blocks of data based on native logs received from a data server, and creating, by the data backup device, a synthetic full backup that overlays one or more of blocks of data of a full backup with the one or more changed blocks, and that shares remaining blocks of the blocks of data with the full backup.

In one embodiment, a computer-implemented method for agentless and accelerated backup of a database may include, receiving, by a data backup device from a data server, blocks of data that provide a full backup of data of the data server. The method additionally includes receiving, by the data backup device from the data server, one or more native logs indicating one or more transactions performed by the data server. The method also includes determining, by the data backup device and based on the native logs, one or more changed blocks of the blocks of data. The method further includes providing, by the data backup device, a point in time restore of the data server by creating a synthetic full backup that overlays one or more of the blocks of data with the one or more changed blocks, and that shares remaining blocks of the blocks of data with the full backup.

In some embodiments of the computer-implemented method, receiving the blocks of data includes receiving the blocks of data over a file sharing mechanism that allows files copied over a file sharing protocol to be catalogued as backups. For example, the file sharing mechanism may include a network file sharing (NFS) data export mechanism. Additionally, the file sharing mechanism may include a writeable overlay. Also, the sharing mechanism may include a data deduplication engine. Additionally or alternatively, receiving the one or more native logs may include receiving the native logs from the data server configured in log replication mode.

In some embodiments of the computer-implemented method, determining the one or more changed blocks may include spinning up a database container image, by the data backup device, and using the database container image to generate a synthetic full copy by applying the native logs to the full backup. In such embodiments, creating the synthetic full backup may include performing a backup of the synthetic full copy.

In another embodiment, a system for agentless and accelerated backup of a database may include a computing device comprising at least one physical processor and physical memory coupled to the at least one physical processor. The at least one physical processor is configured to receive, by a data backup device from a data server, blocks of data that provide a full backup of data of the data server. The at least one physical processor is additionally configured to receive, by the data backup device from the data server, one or more native logs indicating one or more transactions performed by the data server. The at least one physical processor is also configured to determine, by the data backup device and based on the native logs, one or more changed blocks of the blocks of data. The at least one physical processor is further configured to provide, by the data backup device, a point in time restore of the data server by creating a synthetic full backup that overlays one or more of the blocks of data with the one or more changed blocks, and that shares remaining blocks of the blocks of data with the full backup.

In some embodiments of the system, the at least one physical processor is configured to receive the blocks of data at least in part by receiving the blocks of data over a file sharing mechanism that allows files copied over a file sharing protocol to be catalogued as backups. For example, the file sharing mechanism may include a network file sharing (NFS) data export mechanism. Additionally, the file sharing mechanism may include a writeable overlay. Also, the sharing mechanism may include a data deduplication engine. Alternatively or additionally, the at least one physical processor is configured to receive the one or more native logs at least in part by receiving the native logs from the data server configured in log replication mode.

In some embodiments of the system the at least one physical processor may be configured to determine the one or more changed blocks at least in part by spinning up a database container image, by the data backup device, and using the database container image to generate a synthetic full copy by applying the native logs to the full backup. In such embodiments, the at least one physical processor may be configured to create the synthetic full backup at least in part by performing a backup of the synthetic full copy.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive, by a data backup device from a data server, blocks of data that provide a full backup of data of the data server. Additionally, the one or more computer-executable instructions may cause the computing device to receive, by the data backup device from the data server, one or more native logs indicating one or more transactions performed by the data server. Also, the one or more computer-executable instructions may cause the computing device to determine, by the data backup device and based on the native logs, one or more changed blocks of the blocks of data. Further, the one or more computer-executable instructions may cause the computing device to provide, by the data backup device, a point in time restore of the data server by creating a synthetic full backup that overlays one or more of the blocks of data with the one or more changed blocks, and that shares remaining blocks of the blocks of data with the full backup.

In some embodiments, of the non-transitory computer-readable medium, the one or more computer-executable instructions may cause the computing device to receive the blocks of data at least in part by receiving the blocks of data over a file sharing mechanism that allows files copied over a file sharing protocol to be catalogued as backups. Alternatively or additionally, the one or more computer-executable instructions may cause the computing device to determine the one or more changed blocks at least in part by spinning up a database container image, by the data backup device, and using the database container image to generate a synthetic full copy by applying the native logs to the full backup. In such embodiments, the one or more computer-executable instructions may cause the computing device to create the synthetic full backup at least in part by performing a backup of the synthetic full copy.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for agentless and accelerated backup of a database. Media servers (i.e., data servers) are dedicated computer appliances and/or specialized application software, ranging from an enterprise class machine providing video on demand, to a small personal computer or network attached storage (NAS) for the home, dedicated for storing various digital media (e.g., digital videos/movies, audio/music, and picture files). In information technology, a backup, or data backup is a copy of computer data taken and stored elsewhere so that it may be used to restore the original after a data loss event. Backup of data servers using data backup devices can be performed using various types of repository models, but providing features such as incremental backups, instant access, and acceleration typically requires sophisticated elements installed on the production host (e.g., agents, application specific restoration logic, etc.) which are specific to particular types of databases and/or applications. These requirements prevent data backup devices from being generic to many or all databases and can make it difficult or impossible to provide all of the aforementioned features in combination.

The data backup device disclosed herein eliminates the need for an agent on the data server while providing instant access with acceleration. The instant access feature causes a backup to look like a real data copy, but this feature is not available with current schemes in which logs have to be replayed at the data server during a restore procedure. Acceleration features determine which data blocks of a file have changed on the data server and generate and store only the new block(s) to the data backup device. The data backup device then overlays the new block on top the existing block that was changed from the previous backup. In virtualization, an application container is a controlling element for an application instance that runs within a type of virtualization scheme called container-based virtualization. By periodically spinning up a database container image on the data backup device and playing the native log files received from the data server, the data backup device is able to eliminate the need for an agent on the data server and provide instant access with acceleration features. The database container image may be capable of playing and applying logs of a plurality of different types of data bases, and/or there may be multiple types of database container images on the data backup device that can be used for a connected data server implementing a database of the appropriate type according to detected database type, a configuration, etc. As a result, the data backup device can serve various types of databases without requiring installation of an agent on the data server and need to play the logs at the data server during a database restore is reduced or eliminated.

Figure 1:
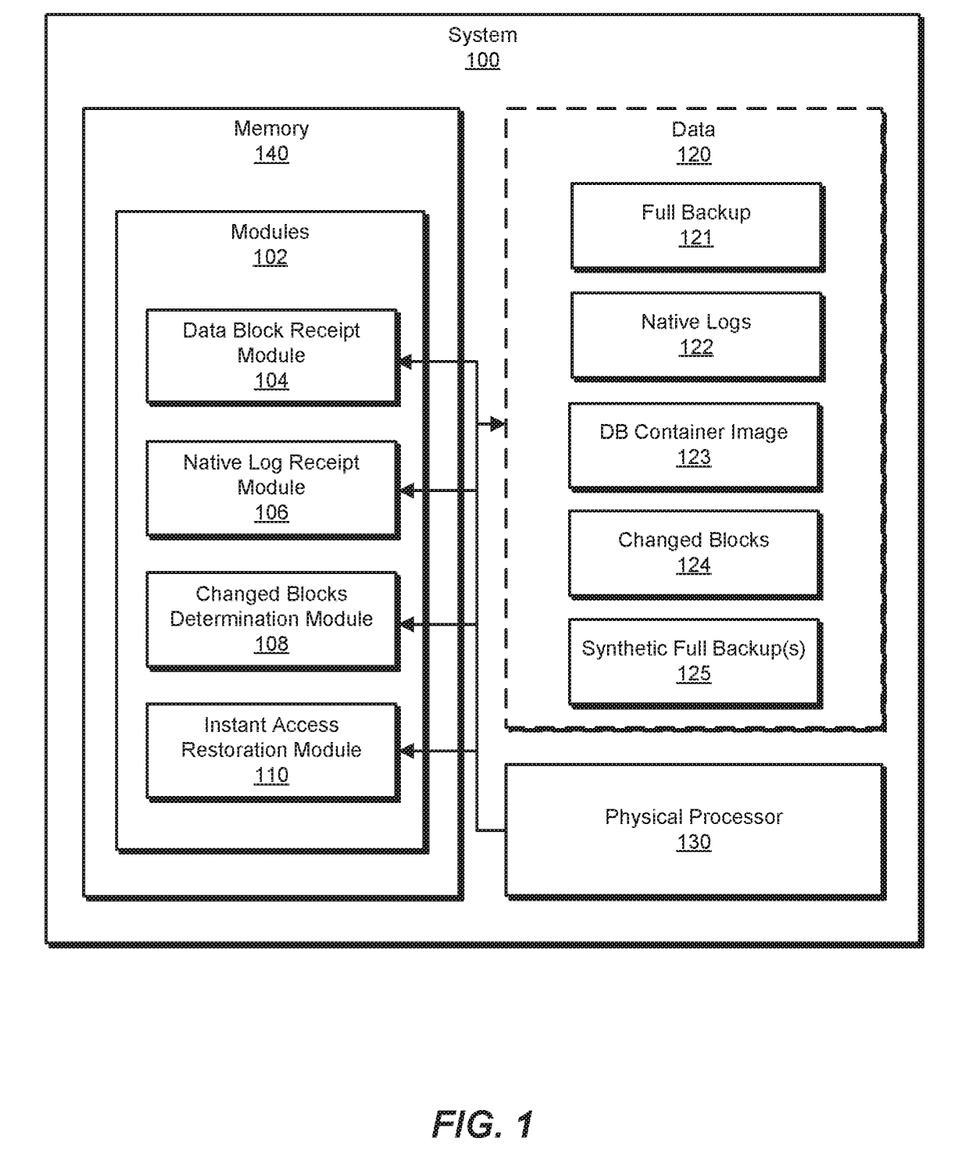
FIG. 1 is a block diagram of an example system for agentless and accelerated backup of a database.

The following will provide, with reference to FIG. 1, detailed descriptions of example systems for agentless and accelerated backup of a database. Detailed descriptions of corresponding computer-implemented methods will also be provided in connection with FIG. 2. Description of a sharing mechanism that may be employed in some implementations is provided with reference to FIG. 3. An example, implementation demonstrating advantages of the disclosed data backup device is provided with reference to FIG. 4. An example of operation is provided with reference to FIGS. 5-9.

FIG. 1 is a block diagram of an example system 100 for agentless and accelerated backup of a database. As illustrated in this figure, example system 100 may include one or more modules 102 for performing one or more tasks. As will be explained in greater detail below, modules 102 may include a data blocks receipt module 104, a native log receipt module 106, a changed block(s) determination module 108, and an instant access restoration module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate agentless and accelerated backup of a database. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more elements of data 120, such as full backup 121, native logs 122, database (DB) container image 123, changed blocks 124, and synthetic full backups 125. Elements of data 120 generally represents any type or form of data or data structure, whether received from a data server or generated by one or more modules 102. In one example, elements of data 120 may include the data blocks received from the data server, and data structures that describe which of the data blocks are members of a particular full or synthetic backup for a point in time restore operation.

It may be readily appreciated that the system 100 for agentless and accelerated backup of a database may include a computing device comprising at least one physical processor 130 and physical memory 140 coupled to the at least one physical processor 130. Utilizing data block receipt module 104, the at least one physical processor 130 is configured to receive, by a data backup device from a data server, blocks of data that provide a full backup 121 of data of the data server. Utilizing native log receipt module 106, the at least one physical processor 130 is additionally configured to receive, by the data backup device from the data server, one or more native logs 122 indicating one or more transactions performed by the data server. Utilizing changed block(s) determination module 108, the at least one physical processor is also configured to determine, by the data backup device and based on the native logs, one or more changed blocks 124 of the blocks of data. Utilizing instant access restoration module 110, the at least one physical processor 130 is further configured to provide, by the data backup device, a point in time restore of the data server by creating a synthetic full backup 125 that overlays one or more of the blocks of data with the one or more changed blocks 124, and that shares remaining blocks of the blocks of data with the full backup 121.

In some embodiments of the system the at least one physical processor may be configured to determine the one or more changed blocks 124 at least in part by spinning up a database container image 133, by the data backup device, and using the database container image 123 to generate a synthetic full copy by applying the native logs 122 to a previous full backup (e.g., the original full backup or a previous synthetic full backup 125). In such embodiments, the at least one physical processor 130 may be configured to create the synthetic full backup 125 at least in part by performing a backup of the synthetic full copy in which an acceleration feature overlays blocks of data of the previous full backup with the changed blocks of data, and shares unchanged blocks of data with the previous full backup.

Many other devices or subsystems may be connected to system 100 in FIG. 1. Conversely, all of the components and devices illustrated in FIG. 1 need not be present to practice the embodiments described and/or illustrated herein. The devices and subsystems referenced above may also be interconnected in different ways from that shown in FIG. 1. Systems 100 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 2:
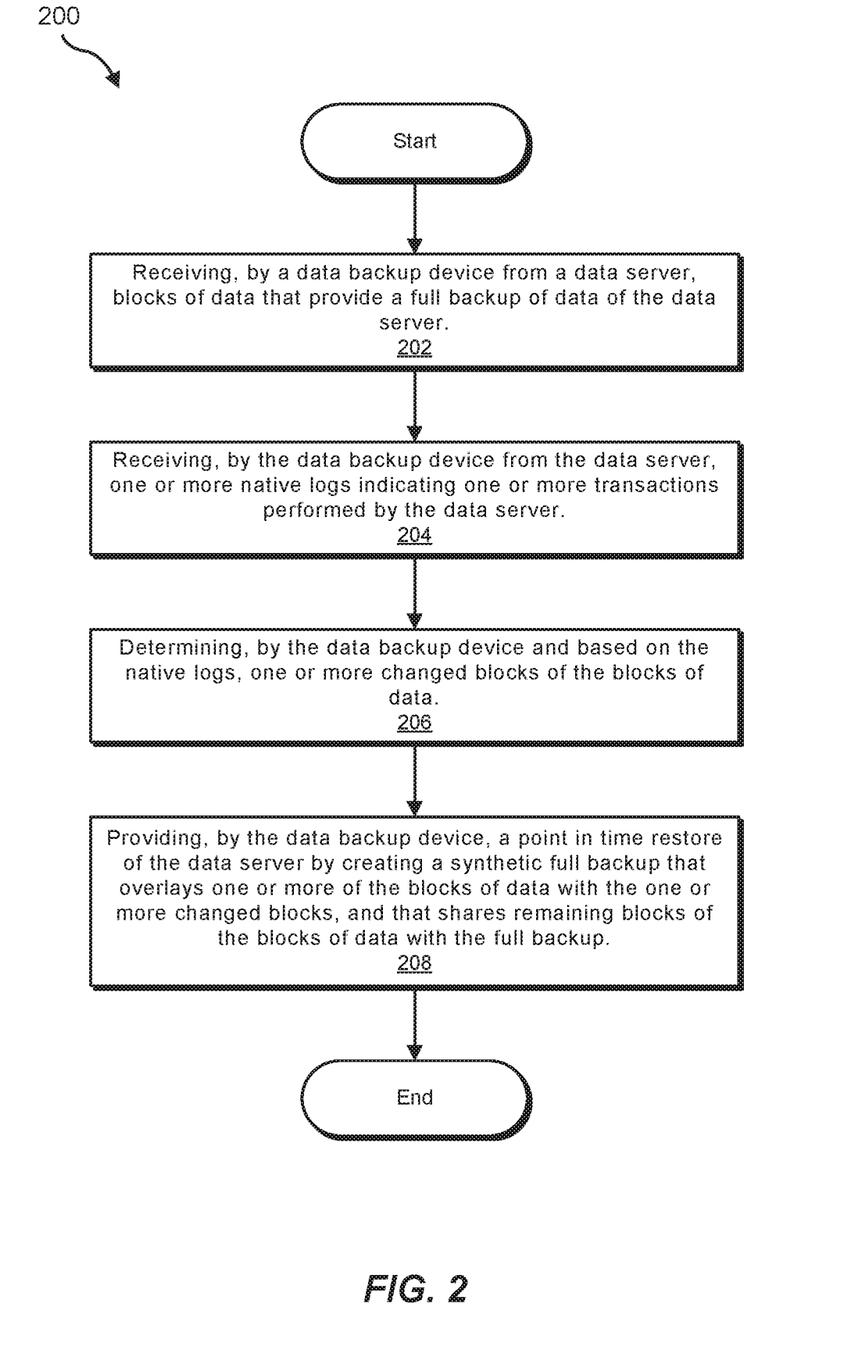
FIG. 2 is a flow diagram of an example method for agentless and accelerated backup of a database.

FIG. 2 is a flow diagram of an example computer-implemented method 200 for agentless and accelerated backup of a database. The steps shown in FIG. 2 may be performed by any suitable computer-executable code and/or computing system, including system 100 in FIG. 1, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 2, at step 202 one or more of the systems described herein may receive, by a data backup device from a data server, blocks of data that provide a full backup of data of the data server. For example, data block receiving module 104 may receive blocks of data that provide a full backup of data of the data server during an initial backup of the data server and store the blocks of data in memory. Additionally, instant access restoration module 110 may catalogue the data blocks as a full backup. In some embodiments, receiving the blocks of data at step 202 includes receiving the blocks of data over a file sharing mechanism that allows files copied over a file sharing protocol to be catalogued as backups. Such a file sharing mechanism is described in greater detail below with reference to FIG. 3. Processing may proceed from step 202 to step 204.

At step 204, one or more of the systems described herein may receive, by the data backup device from the data server, one or more native logs indicating one or more transactions performed by the data server. For example, native log receipt module 106 may receive the native logs from the data server and store the logs in memory. In some embodiments, receiving the blocks of data at step 204 includes receiving the blocks of data over a file sharing mechanism that allows native logs to be received from a data server configured in log replication mode. Such a file sharing mechanism is described in greater detail below with reference to FIG. 3. Processing may proceed from step 204 to step 206.

At step 206, one or more of the systems described herein may determine, by the data backup device and based on the native logs, one or more changed blocks of the blocks of data. For example, changed block(s) determination module 108 may spin up a database container image, by the data backup device, and use the database container image to generate a synthetic full copy by applying the native logs to a previous backup (e.g., the full backup or a previous synthetic backup). Processing may proceed from step 206 to step 208.

At step 208, one or more of the systems described herein may provide, by the data backup device, a point in time restore of the data server by creating a synthetic full backup that overlays one or more of the blocks of data with the one or more changed blocks, and that shares remaining blocks of the blocks of data with the previous backup (e.g., the full backup or a previous synthetic backup). Creating the synthetic full backup at step 208 may include performing a backup of the synthetic full copy by cataloguing the data blocks so that the data blocks that changed overlay corresponding blocks of the previous full backup.

Figure 3:
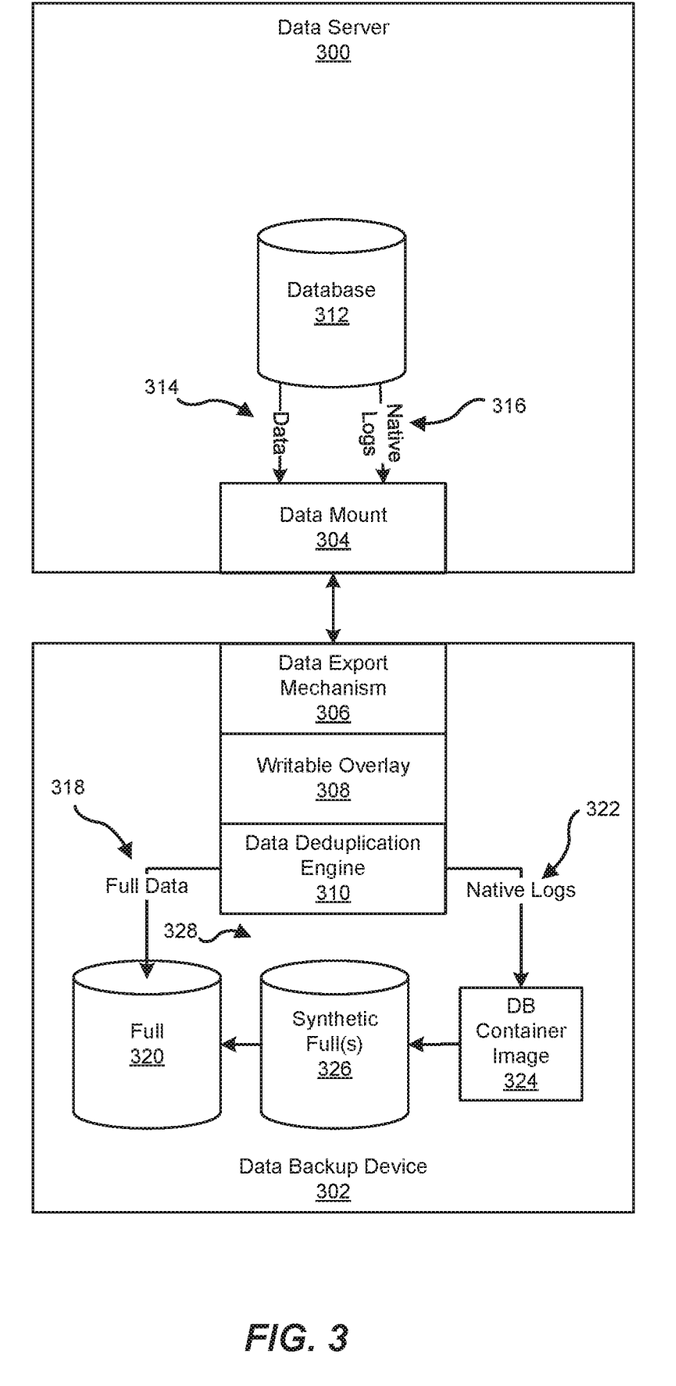
FIG. 3 is a block diagram of an example system for agentless and accelerated backup of a database that implements a sharing mechanism.

Turning now to FIG. 3, an example system for agentless and accelerated backup of a database implements a file sharing mechanism. In this example, a data server 300 having a database 312 is provided with a data mount 304, such as a network file sharing (NFS) mount. NFS is a distributed file system protocol allowing a user on a client computer to access files over a computer network much like local storage is accessed. NFS, like many other protocols, builds on the Open Network Computing Remote Procedure Call (ONC RPC) system. The NFS is an open standard defined in a Request for Comments (RFC), allowing anyone to implement the protocol. Alternatives to NFS include elastic file system (EFS).

In the example of FIG. 3, a data backup device 302 has a data export mechanism 306, such as NFS export. Data backup device also has a writable overlay 308 and a data deduplication engine 310 that can generate and store only changed blocks of data to the data backup device 302, and thus avoid copying blocks of data to the device 302 from the sever 300. An example writeable overlay is Velocity Provisioning File System (VpFS), and an example data deduplication engine is Media Server Deduplication Storage Pool (MSDP).

Together, NFS data mount, NFS data export, VpFS writable overlay, and MSDP deduplication engine combine as a technology known as UniversalShares™. This technology provides a way to export data of a media server as an NFS network file share. The NFS mount provides an ability for the data server 300 to see all of the backups and data stored on the data backup device 302. A UniversalShares™ folder on the data server 300 can be copied to backup the data and deduplication is performed in the background by MSDP. Since data is already copied to the data backup device 302, a backup can be performed by pointing to the data and cataloguing it, without the need to transfer any data from the server 300 to the backup device 302.

As shown in FIG. 3, the data backup device 302 may receive blocks of data 314 (e.g., initial full backup and/or subsequent changed blocks) over a file sharing mechanism that allows files copied over a file sharing protocol to be catalogued as backups. An initial full backup of data blocks 318 may be received and stored as a full backup 320. Thereafter, the data backup device 302 may receive the one or more native logs 316 over the file sharing mechanism from the data server 300 configured in log replication mode. Such logs may be transmitted on demand (e.g., according to a schedule), streamed, transmitted periodically, and/or transmitted in response to an event. The device 302 may periodically (e.g., as scheduled, every threshold number of logs received, whenever a new log is received, etc.), spin up a database container image 324 that plays the received replicas of the native logs 322 and applies them to a previous full backup, as described herein. Cataloguing the resulting full backup copy as a synthetic full backup 326 using a write operation may cause changed blocks 328 to be copied to the device 302 from the server 300.

In a particular example using UniversalShares™ and a PostgreSQL database on data server 300, backup of a full dataset may be performed through pg_basebackup by running "USHARE" backup. Additionally, incremental dataset backup may be accomplished through archive_command. Then, accelerator may be implemented by spinning up a PostgreSQL container on Flex data backup device 302, applying the incremental dataset through pg_standby, and performing "USHARE" backup. Performing "USHARE" backup thus backs up a synthetic full copy and backs up an incremental dataset to provide point-in-time restore capabilities.

In the particular example using UniversalShares™ and a PostgreSQL database on data server 300 and the Flex data backup device 302, a regular restore may be performed from any backup through instant access. Accordingly, a point in time recovery between times $T_1$ and $T_2$ may be performed in part by restoring backup of $T_1$ and restoring incremental logs from $T_2$. Then, the point in time restore may be completed through recovery_target_time, recovery_target_xid, recovery_target_inclusive, and recovery_target_timeline.

Figure 4:
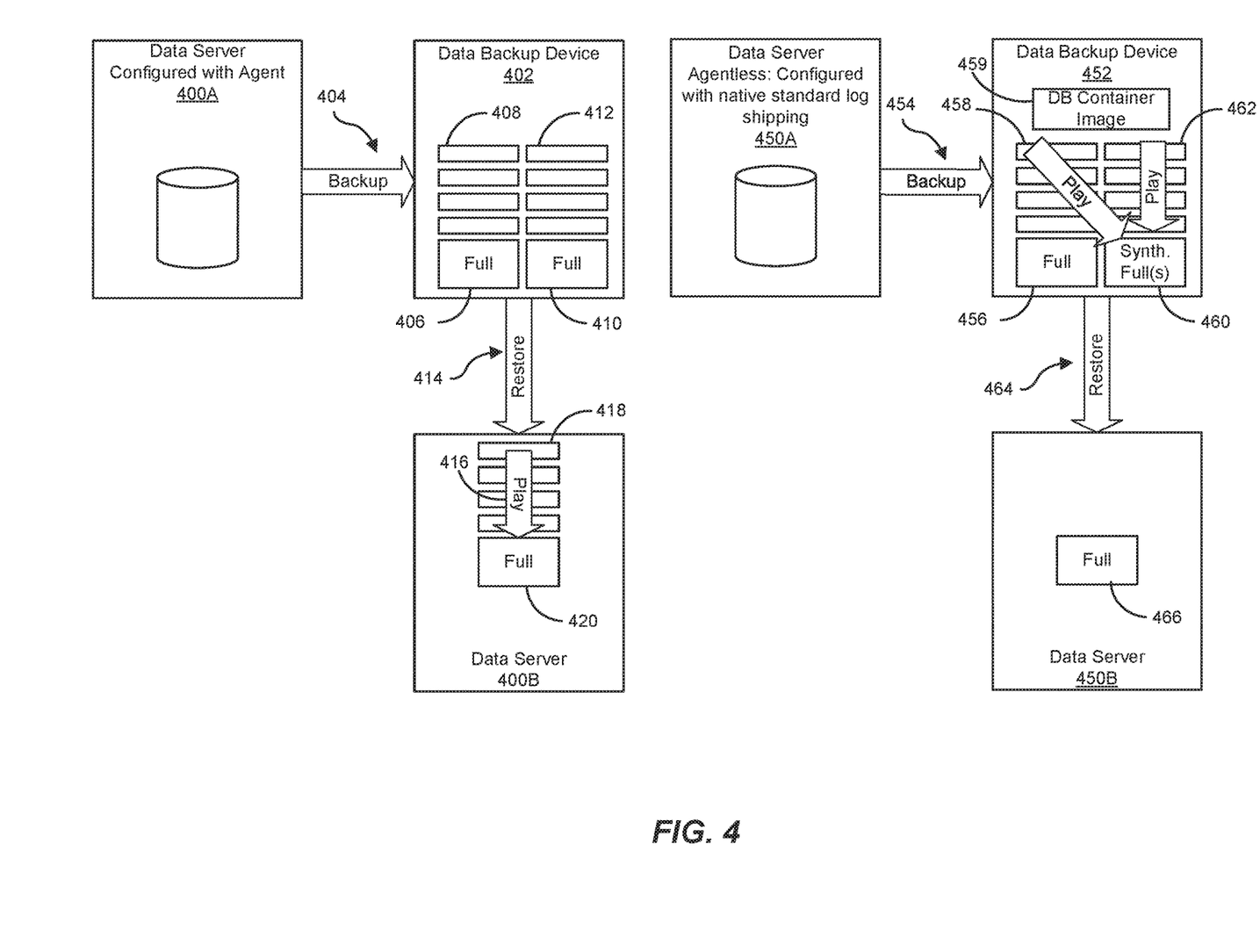
FIG. 4 is a block diagram illustrating an implementation of an example system for agentless and accelerated backup of a database.

Turning to FIG. 4 an implementation of an example system for agentless and accelerated backup of a database demonstrates advantages over log backups using an agent.

For example, a data server 400A that is configured with an agent may perform, at 404, an initial full backup 406 and thereafter utilize an agent to transfer logs 408 to the data backup device 402. Once logs 408 become too numerous, it is necessary to perform, at 404, another full backup 410, after which yet additional logs 412 are transferred to the device 402 by the agent. Thereafter, in order to perform a restore 414 to a most recent restore point, it is necessary for the data sever 400B to copy the latest full backup 410 and all of the additional logs 412 to the data server 400B, and then play, at 416, the copies of the logs 418 and apply them to the copied full backup 420.

In contrast, a data server 450A that does not use an agent, but instead provides data and logs natively to the data backup device 452 having a DB container image 459, may perform, at 454, an initial full backup 456, and thereafter transmit native logs 458 to the data backup device 452. Subsequently, the device 452 may spin up the database container image 459, which plays the native logs 458 and applies them to the most recent full backup, which is the initial full backup 456 in this instance, resulting in a synthetic full copy. This synthetic full copy may then be catalogued as a synthetic full backup of synthetic full backups 460. Thereafter, additional native logs 462 may be received and stored on the device 452. Again, the device 452 may spin up the database container image 459, which plays the additional native logs 462 and applies them to the most recent full backup, which is a most recent synthetic full backup 460 in this instance, resulting in an additional synthetic full copy. This additional synthetic full copy may then be catalogued as an additional one of the synthetic full backups 460. Thereafter, in order to perform a restore 464 to a most recent restore point, it is only necessary for the data sever 400B to copy the latest full backup from among the synthetic full backups 460, resulting in a copied full backup 466 without having to copy or play any logs.

Additionally, it is also possible to perform a transaction level restore by selecting a particular one of the native logs by, for example, providing a transaction identifier corresponding to particular one of the native logs. Then, the most recent full backup (e.g., initial full backup or most recent synthetic backup) that precedes the selected particular one of the native logs may be copied from the device 452 to the data server 400B along with the identified native log and any other native logs that occurred in between the most recent full backup that precedes the selected particular one of the native logs and the identified native log. The resulting subset of native logs may then be played at the data server 400B and applied to the most recent full backup that precedes the selected particular one of the native logs.

From the foregoing, it should be apparent that the system that uses an agent on the data server 400A suffers from the need to perform periodic full backups, cannot take advantage of an accelerator feature, requires substantial recovery time to copy, play, and apply all of the logs during a restore, is not instant access ready, and is susceptible to breaks in an image chain. In contrast, the system that does not use an agent on the data server 450A, and that uses a database container image 459 on the data backup device 452, enjoys numerous advantages. For example, the agentless implementation with native log shipping allows the data backup device to be employed with various types of databases without installing an agent on the data server. Also, the implementation is forever incremental, resulting in no need for the data server to periodically perform full backups. Also, the agentless implementation is able to provide instant access with acceleration features, thus avoiding the need for any recovery processing by the data server 450B. Further, the agentless implementation can perform a restore at transaction level granularity with greatly reduced time required to play only a subset of logs. Finally, the agentless implementation is more resilient to disruptions in the image chain.

Turning now to FIGS. 5-9 and referring generally thereto, an example of operation of the example system for agentless and accelerated backup of a database is provided. Beginning at first time instance T1, a data server 500 has a memory 504 storing data blocks A-C and an objects data structure 506. The objects data structure indicates membership of the data blocks A-D in files A-C. The data server 500 performs an initial full backup, at 512, by transmitting contents of memory 504 to data backup device 502. Data backup device 502 stores the data blocks A-D and the objects data structure 506 in memory 508 and creates a full backup data structure 510 in memory 508 that catalogues the received data as part of the full backup.

Figure 5:
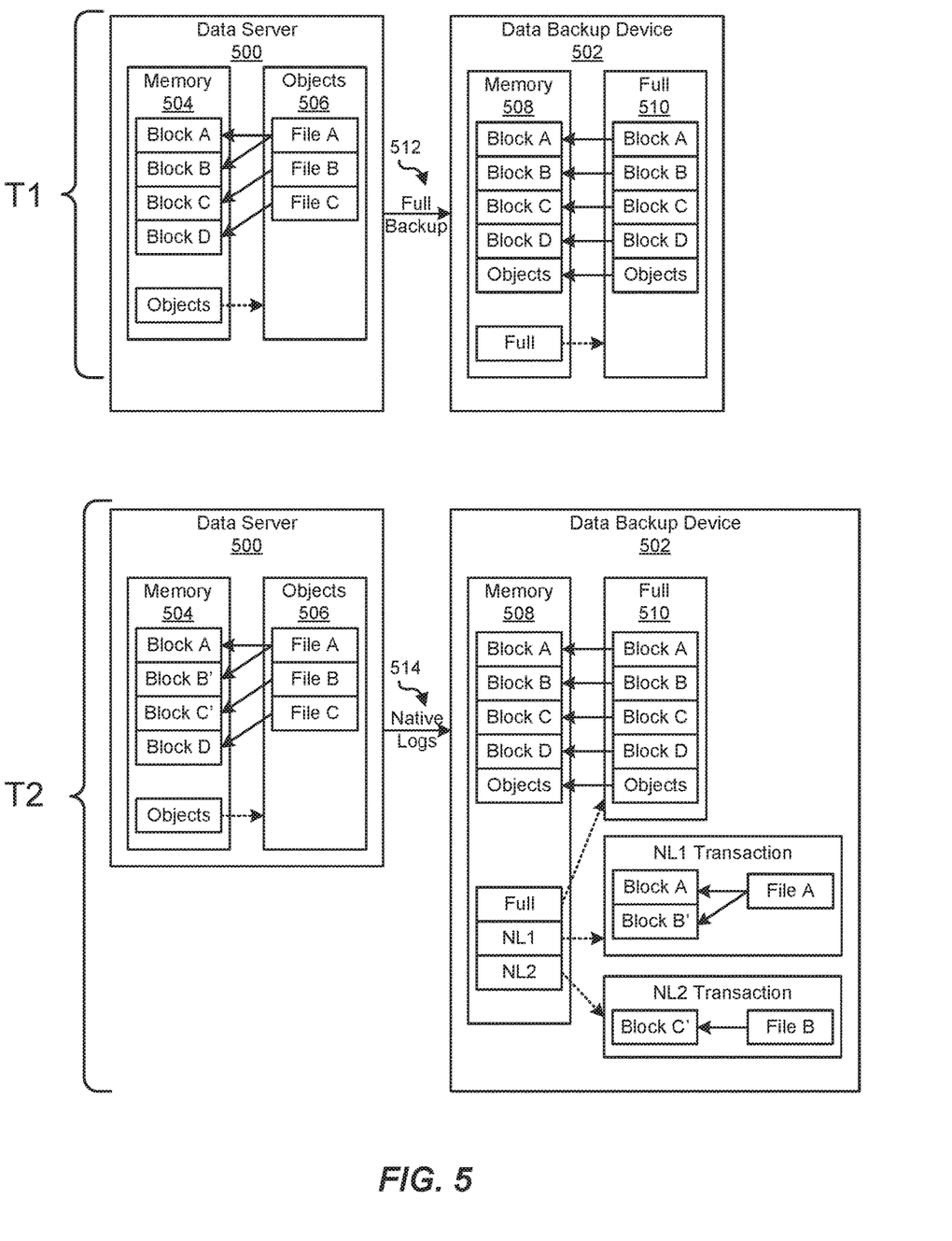
FIG. 5 is a block diagram illustrating a first portion of an example of operation of the example system for agentless and accelerated backup of a database.

Subsequently, at second time instance T2, the data server 500 performs transactions that result in changes to Block B and Block C, resulting in Block B' and Block C'. Data server 500 transmits native logs, at 514, to data backup device 502, which stores the native logs NL1 and NL2 in memory 508. At second time instance T2, the Block B' and Block C' have not yet been copied to the data backup device 502.

Figure 6:
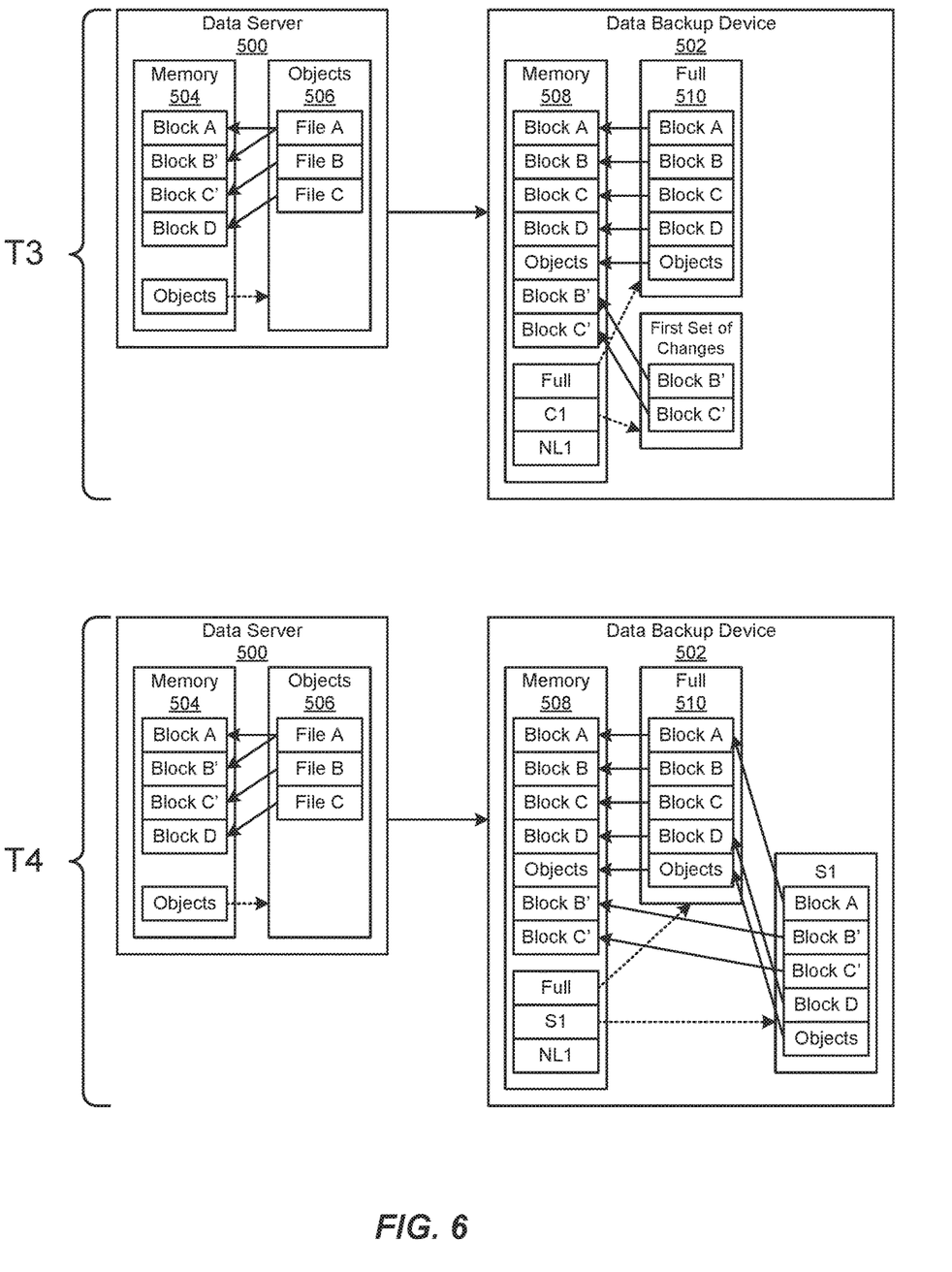
FIG. 6 is a block diagram illustrating a second portion of an example of operation of the example system for agentless and accelerated backup of a database.

At third time instance T3, following second time instance T2, data backup device 502 spins up a container database image, as described herein, and plays the logs Nl1 and NL2 to determine a first set of changes C1, corresponding to Block B' and Block C'. Determining this first set of changes C1 at third time instance T3 generates Block B' and Block C' and stores them in memory 508, avoiding the need to copy any changed blocks from the data server 500. The native log NL1 may be retained in memory as a transaction level restore point. In contrast, native log NL2, which is subsequent to native log NL1 and is the log last received before spinning up the container database image, may be deleted or dereferenced for garbage collection. In this example, NL2 will not be needed for a transaction level restore because a synthetic full backup developed from NL1 and NL2 will provide the same result as such a transaction level restore, but without the need to play any logs at the database server.

Figure 7:
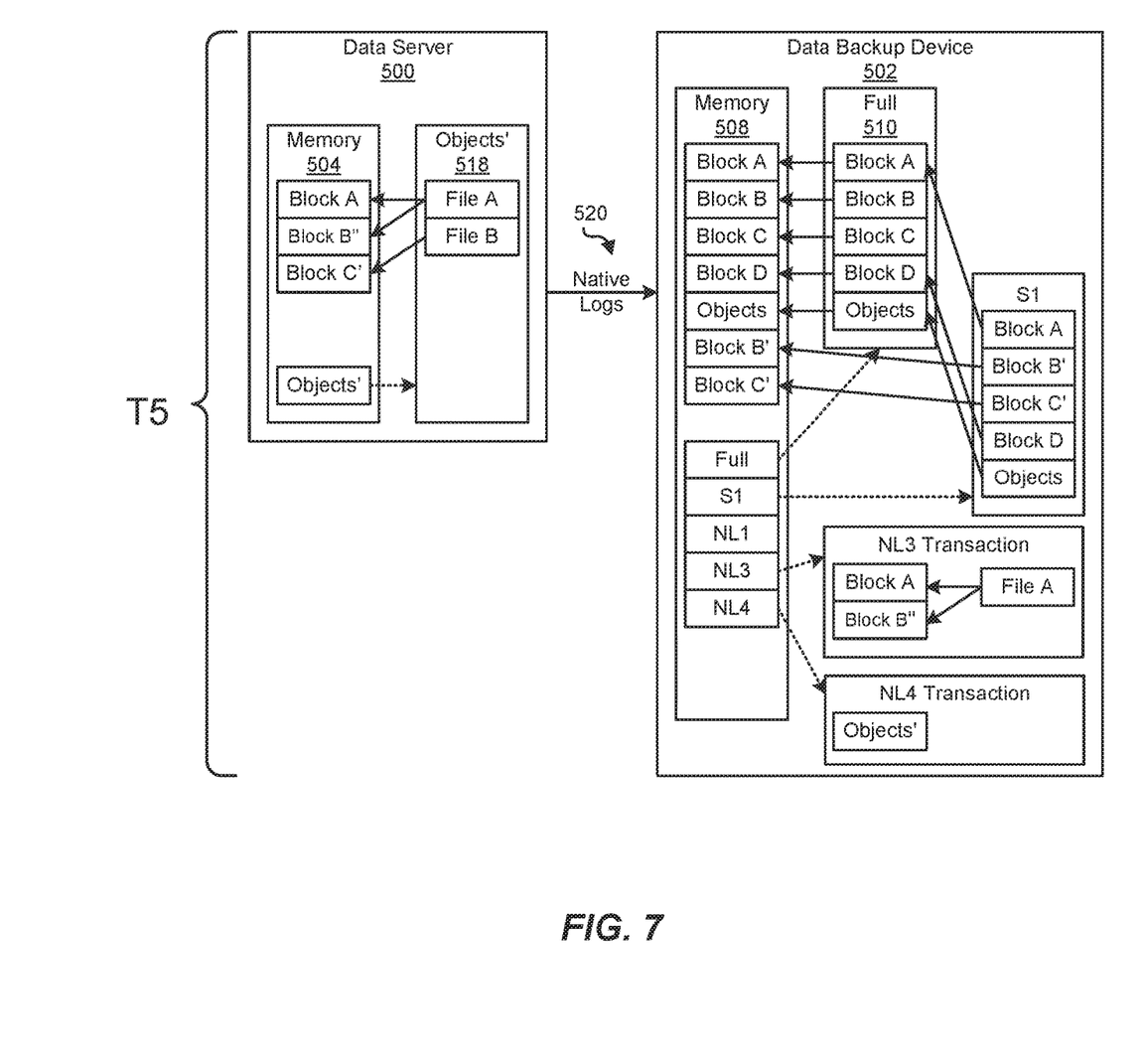
FIG. 7 is a block diagram illustrating a third portion of an example of operation of the example system for agentless and accelerated backup of a database.

At fourth time instance T4, following third time instance T3, data backup device 502 creates a first synthetic full backup S1 by cataloguing blocks of the previous full backup, as recorded in full backup data structure 510, and overlaying Block C' over Block B, and Block C' over Block C. Thereafter, the first set of changes C1 may be deleted or dereferenced for garbage collection, thus reducing consumption of memory 508.

At fifth time instance T5, following fourth time instance T4, the data server 500 performs transactions that result in changes to Block B' and the objects data structure 518 (i.e., by deleting File C and its member Block D), resulting in Block B" and Objects' data structure 518. Data server 500 transmits native logs, at 520, to data backup device 502, which stores the native logs NL3 and NL4 in memory 508. At fifth time instance T5, the Block B" and Objects' data structure 518 have not yet been copied to the data backup device 502.

Figure 8:
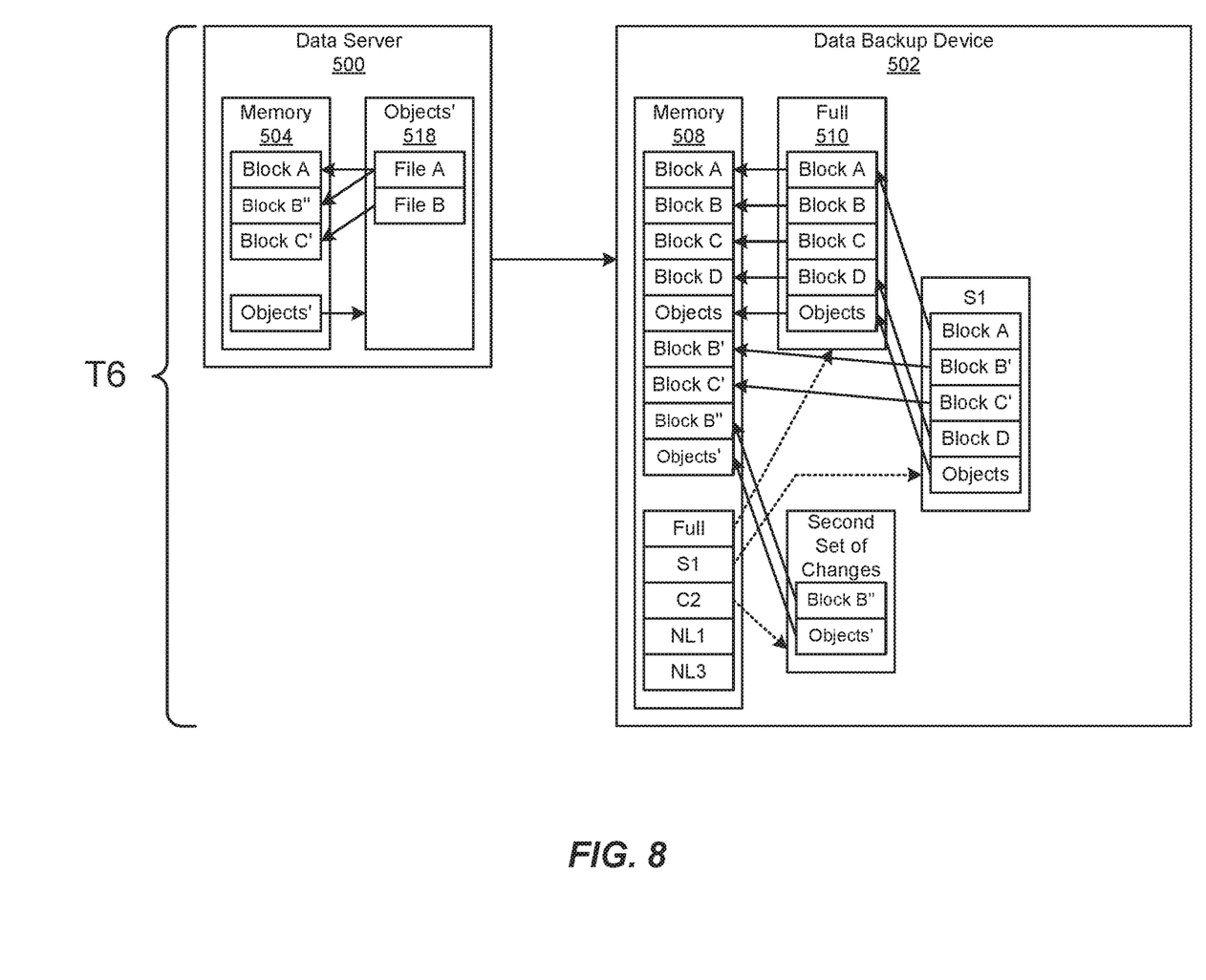
FIG. 8 is a block diagram illustrating a fourth portion of an example of operation of the example system for agentless and accelerated backup of a database.

At sixth time instance T6, following second time instance T5, data backup device 502 spins up the container database image, as described herein, and plays the logs NL3 and NL4 to determine a second set of changes C2, corresponding to Block B" and Objects'.

Determining this second set of changes C2 at sixth time instance T6 obtains Block B" and Objects' and stores them in memory 508, avoiding the need to copy any changed blocks from the data server 500. The native log NL3 may be retained in memory as a transaction level restore point. In contrast, native log NL4, which is subsequent to native log NL3 and is the log last received before spinning up the container database image, may be deleted or dereferenced for garbage collection. In this example, NL4 will not be needed for a transaction level restore because a synthetic full backup developed from NL3 and NL4 will provide the same result as such a transaction level restore, but without the need to play any logs at the database server.

Figure 9:
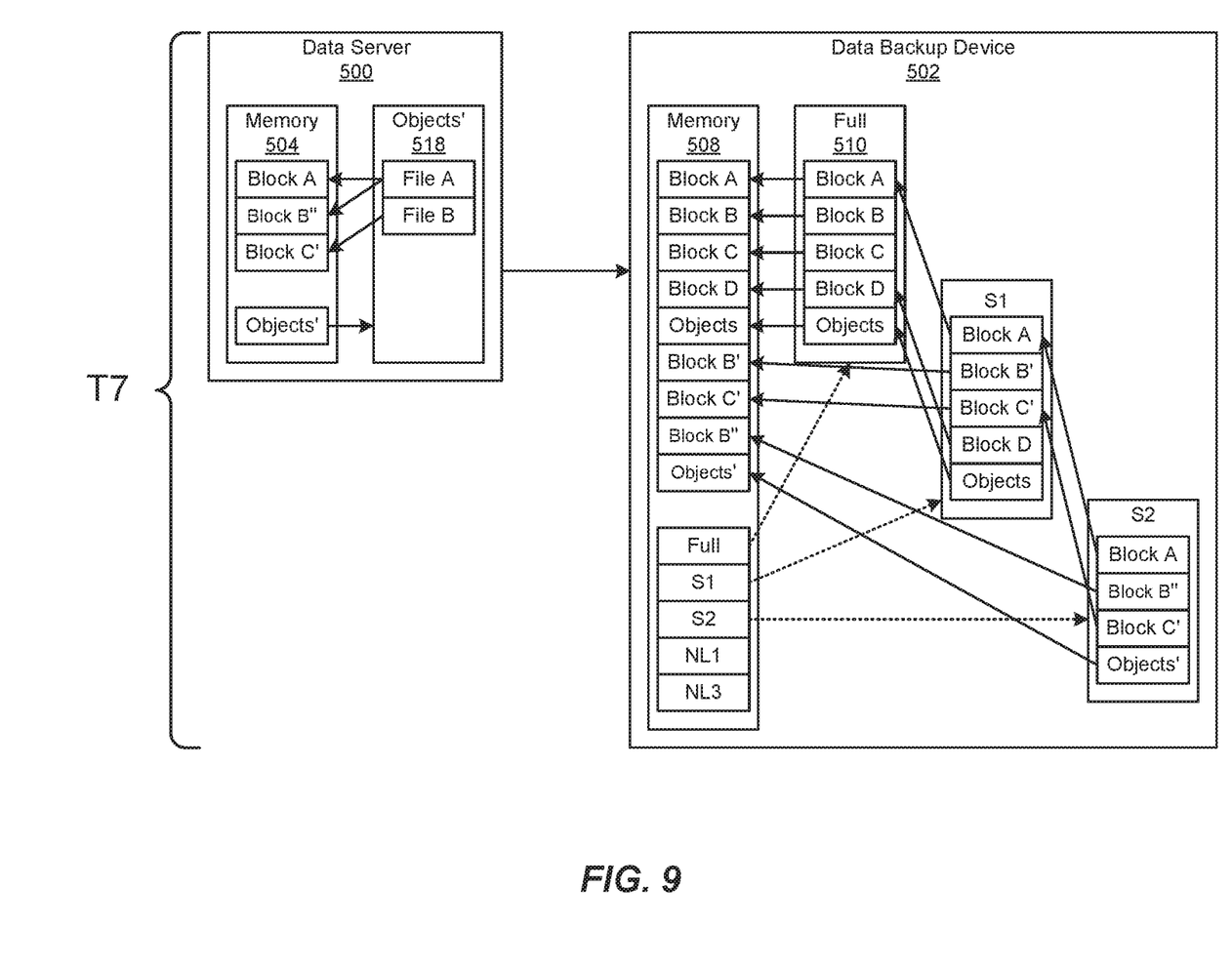
FIG. 9 is a block diagram illustrating a fifth portion of an example of operation of the example system for agentless and accelerated backup of a database.

At seventh time instance T7, following sixth time instance T6, data backup device 502 creates a second synthetic full backup S2 by cataloguing blocks of the previous full backup, as recorded in first synthetic full backup data structure S1, and overlaying Block B" over Block B', and Objects' over Objects. Thereafter, the second set of changes C2 may be deleted or dereferenced for garbage collection, thus reducing consumption of memory 508.

As shown at seventh time instance S7, the data server 500 can see three point in time restore points corresponding to full backup data structure 510, first synthetic full backup S1, and second synthetic full backup S2. Data blocks of any of the full backups may be copied to the data server 500 to perform a restore operation without need to play any logs at the data server 500. The data server 500 can also see two transaction level restore points corresponding to native logs NL1 and NL3. Transaction level restores may also be performed by copying a selected one of native logs NL1 and NL3 to the data server 500 along with data blocks of the immediately preceding full backup thereof (i.e., full backup 510 preceding NL1 or synthetic backup S1 preceding NL3). The copied native log may then be played at the data server 500 and applied to the copy of its preceding full backup in order to complete the transaction level restore. Additionally, any native logs received after a most recent synthetic full backup that have not yet been used to create a synthetic full backup may be used as transaction level restore points. The data server 500 may simply copy the data blocks referenced by the latest synthetic full backup, a selected native log, and any other native logs that precede the selected native log and are subsequent to the latest synthetic full backup, play the resulting subset of native logs, and apply them to the most recent synthetic full backup. Accordingly, the need for the data server 500 to play logs during a restore operation may be eliminated or reduced.

As set forth above, the data backup device described herein uses native log shipping mechanisms provided by most databases to transfer logs to the data backup device (e.g., NetBackup Media Server™) and may also use a file sharing mechanism, such as a file sharing interface of MSDP (UniversalShares™, VpFS) to keep the full backup. Then, bringing up a container periodically that runs the database, the data backup server applies the logs to a previous database copy stored in MSDP to get a synthetic full accelerated copy. This solution is described herein with particular reference to UniversalShares™ as a sharing mechanism and NetBackup Media Server™ as a data backup device, but it is also applicable to any data backup device having a writable overlay, such as VpFS, and a data deduplication engine, such as MSDP.

Full backup of a database may be dumped to UniversalShares™ or a file system interface of the data server, which may dump data files of the database by UniversalShares™ or by copying the TAR file. The datafiles of the database present in UniversalShares™ are backed up by a special policy, which may only catalogue the files, since the data is already present, thus completing the backup very quickly. The database may be configured to archive or replicate logs, and subsequent logs may be copied to a configured location which may be a UniversalShares™ folder, serving as an MSDP interface to VpFS/MSDP. Once copied to the archived location, the database may automatically recycle its logs. Periodically, as per an incremental schedule, a container may be brought up on the data backup device that has a database software version that is compatible with database software on the production host data server. The container image uses database native mechanisms to get logs from the archive location and apply them to its base copy and update the base copy. The backup of the updated copy may then be taken and, as per UShare policy, only updated data blocks of the data files are backed up, since MSDP, being a deduplication datastore, can determine changed blocks and back them up. This procedure ensures that a synthetic full and consistent copy of database files is always available at the data backup device, and that it is instantly accessible since no replay of logs is required in a restore operation. This solution is advantageous because it is a Flex native solution that can be used for quick proliferation or a large number of database workloads.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are, to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for agentless and accelerated backup of a database, at least a portion of the method being performed by a computing device comprising at least one processor, the method comprising:
   receiving, by a data backup device from a data server, blocks of data that provide a full backup of data of the data server;
   receiving, by the data backup device from the data server, one or more native logs indicating one or more transactions performed by the data server;
   determining, by the data backup device and based on the native logs, one or more changed blocks of the blocks of data;
   providing, by the data backup device, a point in time restore of the data server by creating a synthetic full backup that overlays one or more of the blocks of data with the one or more changed blocks, and that shares remaining blocks of the blocks of data with the full backup; and
   retaining in memory, by the data backup device, at least one of the one or more native logs as one or more transaction level restore points.

2. The method of claim 1, wherein receiving the blocks of data includes receiving the blocks of data over a file sharing mechanism that allows files copied over a file sharing protocol to be catalogued as backups.

3. The method of claim 2, wherein the file sharing mechanism includes a network file sharing (NFS) data export mechanism.

4. The method of claim 2, wherein the file sharing mechanism includes a writeable overlay.

5. The method of claim 2, wherein the sharing mechanism includes a data deduplication engine.

6. The method of claim 1, wherein receiving the one or more native logs includes receiving the native logs from the data server configured in log replication mode.

7. The method of claim 1, wherein determining the one or more changed blocks includes spinning up a database container image, by the data backup device, and using the database container image to generate a synthetic full copy by applying the native logs to the full backup.

8. The method of claim 7, wherein creating the synthetic full backup includes performing a backup of the synthetic full copy.

9. A system for agentless and accelerated backup of a database, the system comprising:
   a computing device comprising at least one physical processor; and
   physical memory coupled to the at least one physical processor, wherein the at least one physical processor is configured to:
   receive, by a data backup device from a data server, blocks of data that provide a full backup of data of the data server;
   receive, by the data backup device from the data server, one or more native logs indicating one or more transactions performed by the data server;
   determine, by the data backup device and based on the native logs, one or more changed blocks of the blocks of data;
   provide, by the data backup device, a point in time restore of the data server by creating a synthetic full backup that overlays one or more of the blocks of data with the one or more changed blocks, and that shares remaining blocks of the blocks of data with the full backup; and retain in memory, by the data backup device, at least one of the one or more native logs as one or more transaction level restore points.

10. The system of claim 9, wherein the at least one physical processor is configured to receive the blocks of data at least in part by receiving the blocks of data over a file sharing mechanism that allows files copied over a file sharing protocol to be catalogued as backups.

11. The system of claim 10, wherein the file sharing mechanism includes a network file sharing (NFS) data export mechanism.

12. The system of claim 10, wherein the file sharing mechanism includes a writeable overlay.

13. The system of claim 10, wherein the sharing mechanism includes a data deduplication engine.

14. The system of claim 9, wherein the at least one physical processor is configured to receive the one or more native logs at least in part by receiving the native logs from the data server configured in log replication mode.

15. The system of claim 9, wherein the at least one physical processor is configured to determine the one or more changed blocks at least in part by spinning up a database container image, by the data backup device, and using the database container image to generate a synthetic full copy by applying the native logs to the full backup.

16. The system of claim 15, wherein the at least one physical processor is configured to create the synthetic full backup at least in part by performing a backup of the synthetic full copy.

17. A non-transitory computer-readable medium comprising one or more computer-executable instructions that, when executed by at least one processor of a computing device, cause the computing device to:

receive, by a data backup device from a data server, blocks of data that provide a full backup of data of the data server;

receive, by the data backup device from the data server, one or more native logs indicating one or more transactions performed by the data server;

determine, by the data backup device and based on the native logs, one or more changed blocks of the blocks of data;

provide, by the data backup device, a point in time restore of the data server by creating a synthetic full backup that overlays one or more of the blocks of data with the one or more changed blocks, and that shares remaining blocks of the blocks of data with the full backup; and retaining in memory, by the data backup device, at least one of the one or more native logs as one or more transaction level restore points.

18. The non-transitory computer-readable medium of claim 17, wherein the one or more computer-executable instructions cause the computing device to receive the blocks of data at least in part by receiving the blocks of data over a file sharing mechanism that allows files copied over a file sharing protocol to be catalogued as backups.

19. The non-transitory computer-readable medium of claim 17, wherein the one or more computer-executable instructions cause the computing device to determine the one or more changed blocks at least in part by spinning up a database container image, by the data backup device, and using the database container image to generate a synthetic full copy by applying the native logs to the full backup.

20. The non-transitory computer-readable medium of claim 19, wherein the one or more computer-executable instructions cause the computing device to create the synthetic full backup at least in part by performing a backup of the synthetic full copy.

* * * * *